United States Patent [19]

Danner

[11] Patent Number: 5,153,920
[45] Date of Patent: Oct. 6, 1992

[54] METHOD AND CIRCUIT ARRANGEMENT FOR THE ACCEPTANCE AND FORWARDING OF MESSAGE CELLS TRANSMITTED ACCORDING TO AN ASYNCHRONOUS TRANSFER MODE BY AN ASYNCHRONOUS TRANSFER MODE SWITCHING EQUIPMENT

[75] Inventor: Gerd Danner, Munich, Fed. Rep. of Germany

[73] Assignee: Siemens Aktiengesellschaft, Munich, Fed. Rep. of Germany

[21] Appl. No.: 738,358

[22] Filed: Jul. 31, 1991

[30] Foreign Application Priority Data

Aug. 10, 1990 [EP] European Pat. Off. ........... 90115417
Jun. 6, 1991 [EP] European Pat. Off. ........... 91109315

[51] Int. Cl.⁵ ............................ H04K 1/00; H04J 3/24
[52] U.S. Cl. ...................................... 380/48; 370/94.1
[58] Field of Search .................... 380/23, 48; 370/60, 370/60.1, 94.1, 94.2

[56] References Cited

U.S. PATENT DOCUMENTS

| | | | |
|---|---|---|---|
| 4,794,589 | 12/1988 | Finch et al. | 370/60 |
| 4,797,875 | 1/1989 | Popischil et al. | 370/60 |
| 4,932,020 | 6/1990 | Pashan et al. | 370/14 |
| 4,975,907 | 12/1990 | Dutruel et al. | 370/94.1 |
| 5,062,106 | 10/1991 | Yamazaki et al. | 370/60 |

OTHER PUBLICATIONS

"Packet Structure for Self-Routing Switch Fabric", IBM Technical Disclosure Bulletin, vol. 31, No. 2, Jul. 1988, pp. 465-466.

Primary Examiner—Salvatore Cangialosi
Attorney, Agent, or Firm—Hill, Van Santen, Steadman & Simpson

[57] ABSTRACT

For receiving and forwarding message cells transmitted according to an asynchronous transfer mode (ATM) by an ATM switching equipment which comprises a multi-stage reversing switching matrix network, each of the message cells has a routing information block having a plurality of routing information corresponding in number of the plurality of switching matrix stages to be traversed located in front thereof within the ATM switching equipment and the routing information just evaluated for the forwarding of a message cell through one of the switching matrix stages is subsequently displaced to the end of the respective routing information block. It is thereby provided that each of the routing information of the routing information block has a separate security information attached thereto and the security information is falsified, together with the displacement of a routing information to the end of the respective routing information block. A message cell is thereby only forwarded via a switching matrix stage when the routing information to be evaluated for that purpose has been recognized as being free of error on the basis of the attached security information.

5 Claims, 4 Drawing Sheets

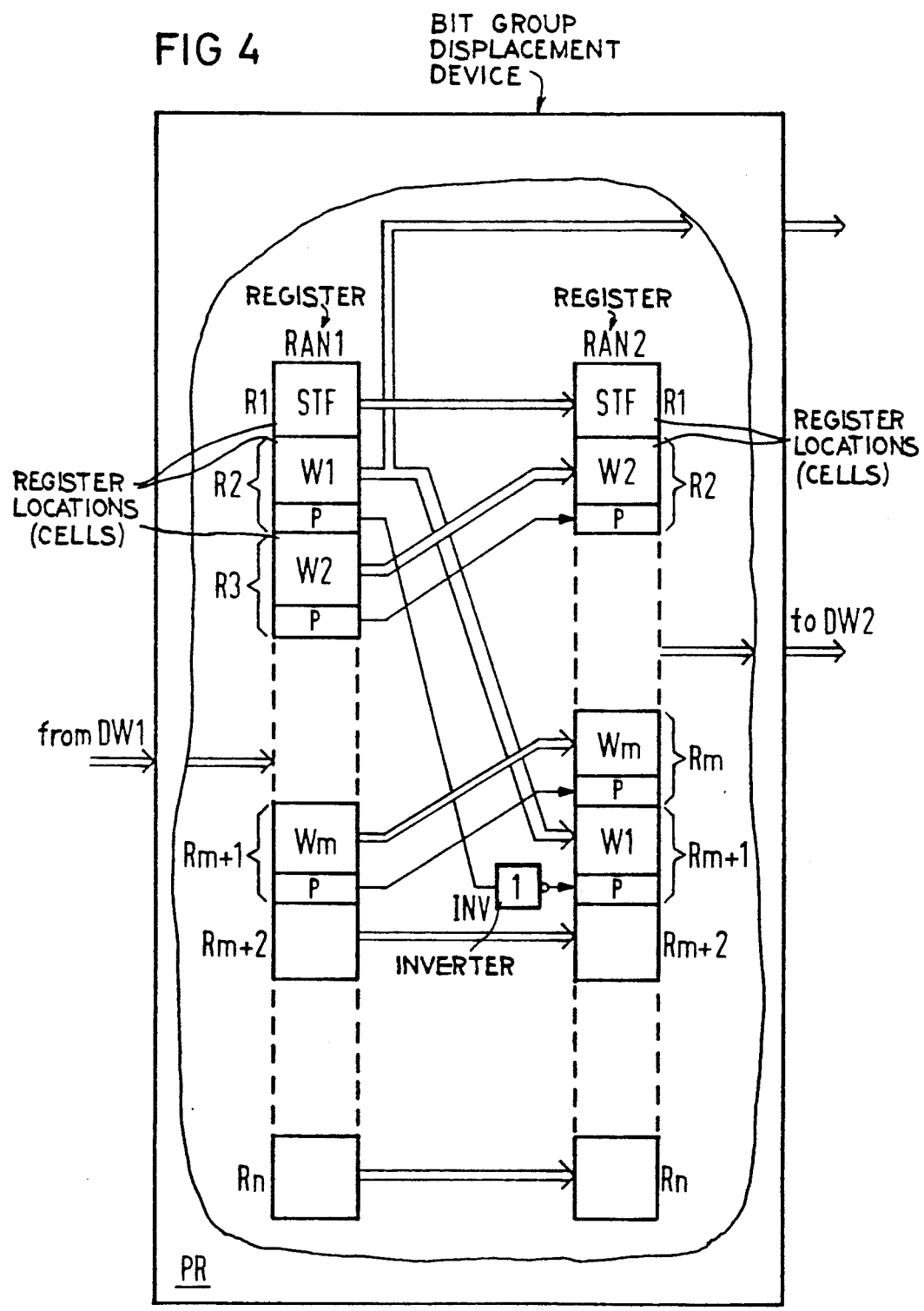

METHOD AND CIRCUIT ARRANGEMENT FOR THE ACCEPTANCE AND FORWARDING OF MESSAGE CELLS TRANSMITTED ACCORDING TO AN ASYNCHRONOUS TRANSFER MODE BY AN ASYNCHRONOUS TRANSFER MODE SWITCHING EQUIPMENT

BACKGROUND OF THE INVENTION

1. Field of the Invention

The present invention relates to a method and to a circuit arrangement for accepting and forwarding message cells transmitted according to an asynchronous transfer mode (ATM) by an ATM switching equipment which comprises a multi-stage reversing switching matrix network, whereby each of the message cells within the ATM switching equipment is preceded by a routing information block having a plurality of routing information corresponding in number to the plurality of switching matrix stages to be traversed and the routing information just evaluated for the forwarding of a message cell through one of the switching matrix stages is subsequently displaced to the end of the respective routing information block.

2. Description of the Prior Art

A method and a circuit arrangement of the type generally set forth above are known in the art for general ATM switching equipment, such as U.S. Pat. No. 4,491,945, fully incorporated herein by this reference. Given the application of this known method in an ATM switching equipment comprising a multi-stage reversing switching matrix network, it can occur that message cells are misrouted within the reversing switching matrix arrangement due to hardware errors or, respectively, bit falsifications and, instead of leaving the reversing switching matrix arrangement, are conducted back thereto. In such a case, there is the risk that the message cells will constantly remain (circulate) in a loop in the reversing switching matrix network.

SUMMARY OF THE INVENTION

It is therefore an object of the present invention to provide, given a method and a circuit arrangement of the type set forth above, message cells can be prevented from remaining in a reversing switching matrix network.

In a method of the type in which message cells are accepted and forwarded, being transmitted according to an asynchronous transfer mode by an ATM switching equipment which comprises a multi-stage reversing switching matrix network, in which each of the message cells within the ATM switching equipment is preceded by a routing information block having a plurality of routing information corresponding in number to the plurality of switching matrix stages to be traversed and the routing information just evaluated for the forwarding of the message cell through one of the switching matrix stages is subsequently displaced to the end of the respective routing information block, according to the present invention, the method is particularly characterized in that each of the routing information of a routing information block has a separate security information attached thereto, in that the appertaining security information is falsified with the displacement of a routing information to the end of the respective routing information block, and in that a message cell is only forwarded via a switching matrix stage when the routing information to be evaluated therefor has been recognized as error-free information with reference to the attached security information.

Practicing of the present invention yields the advantage that a message cell can be prevented from remaining in a reversing switching matrix network with low control expense by attaching a security information to every routing information contained in a routing information block and by intentional falsification of such a security information given the displacement of the routing information to the end of the routing information block. When a message cell erroneously does not depart the reversing switching matrix network after all routing information contained in the appertaining routing information block have been processed, particular, then this is recognized on the basis of the falsified security information and the appertaining message cell is no longer forwarded within the reversing switching matrix network in response thereto.

According to an advantageous development and feature of the invention in the method set forth above, the method is further characterized in that a parity bit is provided as a respective security information and attached to the routing information, and in that the appertaining parity bit is inverted with the displacement of a routing information to the end of the respective routing information block. The advantage of this development and feature of the invention is that only one parity bit is attached to the individual routing information as a respective security information, so that the message cells to be transmitted within the reversing switching matrix network are only slightly expanded in comparison to the message cells originally accepted into the ATM switching equipment.

Another object of the invention is to provide a circuit arrangement for the acceptance and forwarding of message cells transmitted according to an asynchronous transfer mode by an ATM switching equipment which comprises a multistage reversing switching matrix network, in which each of the message cells accepted via input lines of the ATM switching equipment has a routing information blocked which comprises a plurality of routing information corresponding in number to the plurality of switching matrix stages to be traversed located in front thereof by a handling device assigned to the respective input line and in which input lines of a switching matrix stage have a respective evaluation device assigned thereto, the evaluation device subsequently displacing the routing information just evaluated for the forwarding of the message cell via the respective switching matrix stage to the end of the respective routing information block, and according to the present invention, is particularly characterized in that the handling devices respectively attach a separate security information to each of the routing information of a routing information block, in that the evaluation devices respectively falsify the appertaining security information together with the displacement of a routing information to the end of the routing information block, and in that the evaluation devices respectively forward a message cell via the appertaining switching matrix stage only when the routing information to be interpreted therefor is recognized as free of error on the basis of the attached security information.

The advantage of a circuit arrangement of the type set forth above is that message cells erroneously remaining in a reversing switching matrix network are recognized by decentralized equipment present in the individual switching matrix stages of the reversing switching matrix network and are destroyed, so that the central equipment of the ATM switching equipment are relieved of such monitoring.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 4 is a schematic block circuit diagram illustrating a possible structure of the device for displacing bit groups (routing information) that is schematically illustrated in FIG. 3.

DESCRIPTION OF THE PREFERRED EMBODIMENTS

Figure 1:
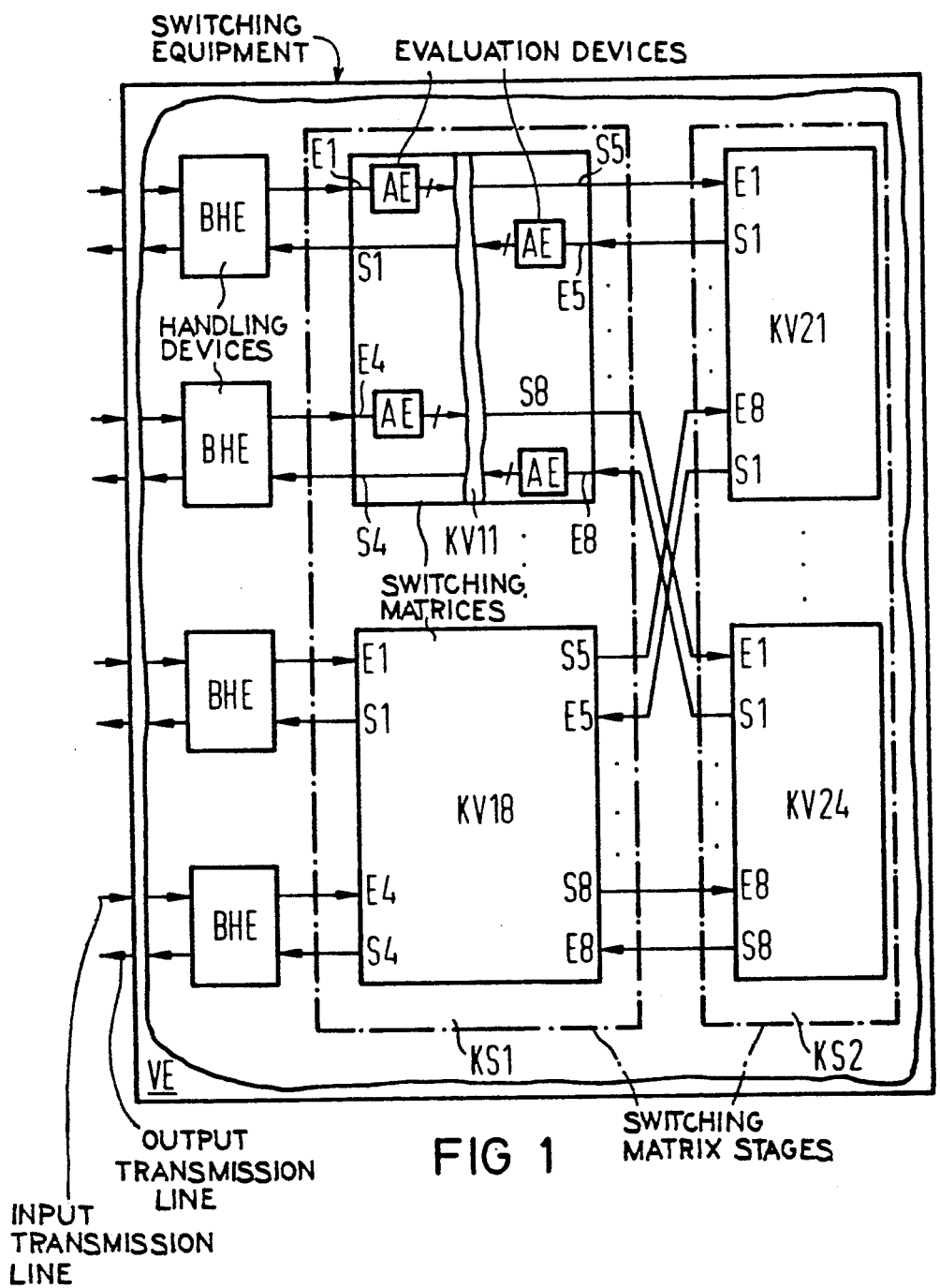
FIG. 1 is a schematic block diagram representation of an ATM switching equipment for practicing the present invention.

FIG. 1 illustrates an excerpted view of an ATM switching equipment VE as comprising a plurality of handling device BHE to which, respectively, two external transmission lines are connected, namely an input transmission line and an output transmission line. Within the ATM switching equipment VE, the handling devices BHE are in communication with a first switching matrix stage KS1 of a reversing switching matrix network constructed as a two-stage network here by way of example, being in communication therewith via the connecting lines respectively assigned to the appertaining external transmission lines. The first switching matrix stage KS1 is formed of eight switching matrices KV11-KV18, as an example. Only the switching matrices KV11 and KV18 are illustrated in FIG. 1. Each of the switching matrices has eight inputs referenced E1-E8 as well as eight outputs referenced S1-S8 available thereto. Inputs and outputs bearing the same reference characters are thereby assigned to one another. The aforementioned handling devices BHE are connected to the inputs and outputs E1/S1-E4/S4 assigned to one another. The remaining inputs and outputs E5/S5-E8/S8 assigned to one another in the individual switching matrices, by contrast, are in communication via connecting lines to four switching matrices KV21-KV24 that form a second switching matrix stage KS2. Of these switching matrices, only the switching matrices KV21 and KV24 are illustrated in FIG. 1.

As with the switching matrices of the first switching matrix stage KS1, each of these switching matrices KV21-KV24 comprises eight inputs E1-E8 and eight outputs S1-S8 assigned thereto. In accordance with the reversing principle employed here, two connecting lines allocated to one another and provided for opposite transmission directions thereby exist for each connection between a switching matrix of the first switching matrix stage KS1 and a switching matrix of the second switching matrix stage KS2. According to FIG. 1, for example, the connecting line lying between the output S5 of the switching matrix KV11 and the input E1 of the switching matrix KV21 therefore has the connecting line assigned thereto that lies between the output S1 of the switching matrix KV21 and the input E5 of the switching matrix KV11.

As indicated for the switching matrix KV11, a separate evaluation device AE is provided whose function shall be discussed in greater detail below and which is assigned to each of the individual input lines E1-E8 of the switching matrices illustrated in FIG. 1.

The ATM switching equipment V that has just been set forth serves the purpose of accepting and forwarding message cells having fixed cell length transmitted according to an asynchronous transfer mode, the message cells comprising what is referred to as a cell header, in addition to a plurality of message signal bits to be transmitted. Given what is referred to as the self-routing principle employed here within the ATM switching equipment, a routing information for each of the switching matrix stages to be traversed is inserted into the respective cell header given the acceptance of message cells via the aforementioned, external transmission lines, namely in the sequence of the planned transmission through the equipment. A separate security information in the form of, for example, a parity bit is thereby respectively attached to the routing information. Message cells protected in this manner in view of the routing information are then supplied to the evaluation device AE connected to the respective handling device BHE. First, the first routing information contained in the respective cell header is subjected here to a check for accuracy on the basis of the appertaining security information (parity bit). Given the presence of accuracy, the respective message cell is then routed via the switching matrix coming into consideration to the switching matrix stage KS according to the prescription of the routing information which must be checked. Given this forwarding, the routing information just employed is thereby displaced to the end of the routing information block within the cell header, whereby a falsification of the appertaining security information simultaneously occurs. Given the utilization of a parity bit as the security information that has been assumed as an example, therefore, this parity bit is inverted during the displacement.

When, by contrast, a faulty routing information is recognized in the aforementioned check, then the respective message cell is not forwarded, i.e. this message cell is destroyed.

The evaluation of message cells that has just been set forth is repeated in each evaluation device AE of the switching matrices traversed during the course of the respective virtual connection, so that the individual message cells are forwarded via the aforementioned, external transmission lines to following equipment of the ATM switching equipment in the normal case, i.e. given accuracy of the individual routing information within a message cell. The case can also occur, however, that a message cell is misrouted, for example, within the reversing switching matrix network given the appearance of a double error in one of the routing information caused by bit falsifications and remains in the reversing switching matrix network after all of the routing information originally entered in the appertaining cell header has been handled. In this case, an evaluation of a routing information whose appertaining security information (parity bit) had been previously intentionally falsified then is available in one of the evaluation devices AE. An evaluation of these two information consequently leads to the appertaining evaluation device recognizing an error in the routing information and therefore destroys the message cell waiting for forwarding in the above-mentioned manner. Message cells are therefore prevented from constantly circulating in a loop, or, respectively, from being misrouted within the reversing switching matrix network due to transmission errors.

A possible structure of the aforementioned evaluation device AE shall be set forth below with reference to FIG. 2. According to FIG. 2, the input side of such an evaluation device comprises a series-to-parallel converter S/P that, on the one hand, subdivides message cells supplied thereto in serial form into bit groups having a respectively-defined plurality of bits and that subsequently forwards the individual bit groups to a data selector in parallel form. It is hereby assumed that the plurality of bits contained in such a bit group corresponds to the plurality of bits of a routing information including the assigned parity bit.

On the other hand, the series-to-parallel converter S/P constantly monitors the appearance of cell headers. This, for example, can occur with the assistance of a comparator that is supplied with the bit group existing in parallel form and thereby indicated (start flag) the presence of a bit group indicating the beginning of a cell header. When such a start flag is present, the data selector DW1 is controlled by a control signal output by the series-to-parallel converter S/P such that the bit groups belonging to the appertaining cell header are supplied via the data selector to a parity check device PC which is constructed in a known manner and are also supplied to a device PR for the displacement of bit groups. The bit groups following the appertaining cell header, by contrast, are supplied to a register Reg after a switching of the data selector DW1 and are initially intermediately stored in the register Reg.

The parity check device PC checks the first, received routing information for accuracy with reference to the attached security information (parity bit). The check result is thereby indicated as a check output. Simultaneously, the bit group displacement device PR makes the routing information just checked by the parity check device available at first outputs. Based on the measure of these routing information, the message cell just now passing through the evaluation device AE is accepted into a queuing memory, for a subsequent forwarding, that is assigned to the output lines of the appertaining switching matrix in case the parity check device PC has indicated an error-free routing information. Since the control of such queuing memories and the subsequent forwarding of the message cells stored in these memories are not the subject matter of the present invention, the same shall not be discussed here in greater detail.

For the aforementioned acceptance of the message cells traversing the evaluation device AE into one of the queuing memories of the switching matrix, the cell header just supplied to the bit group displacement device PR is modified by the device PR such that the routing information heretofore appearing at the first location is displaced to the end of the routing information block. Simultaneously, the security information belonging to this routing information is therefore falsified, i.e. the parity bit serving as security information is inverted. This modified cell header that is current for the forwarding of the message cells is then supplied via second outputs of the bit group displacement device PR to first inputs of a data selector DW2 that forwards this cell header for the aforementioned intermediate storage. By way of second inputs of the data selector DW2, the bit groups of the message cell previously accepted into the register Reg are subsequently attached to the cell header. The dwell time of the individual bit groups within the register Reg is thereby defined such that the message cell provided with a modified cell header can be intermediately stored gap free in the manner set forth above.

As mentioned above, the intermediate storing of a message cell in one of the queuing memories only occurs when the routing information required for that purpose had been previously recognized by the parity check device PC as being error-free information. When, by contrast, the parity check device PC identifies a faulty routing information, then an intermediate storage and subsequent forwarding of the appertaining message cell is not carried out.

Figure 3:
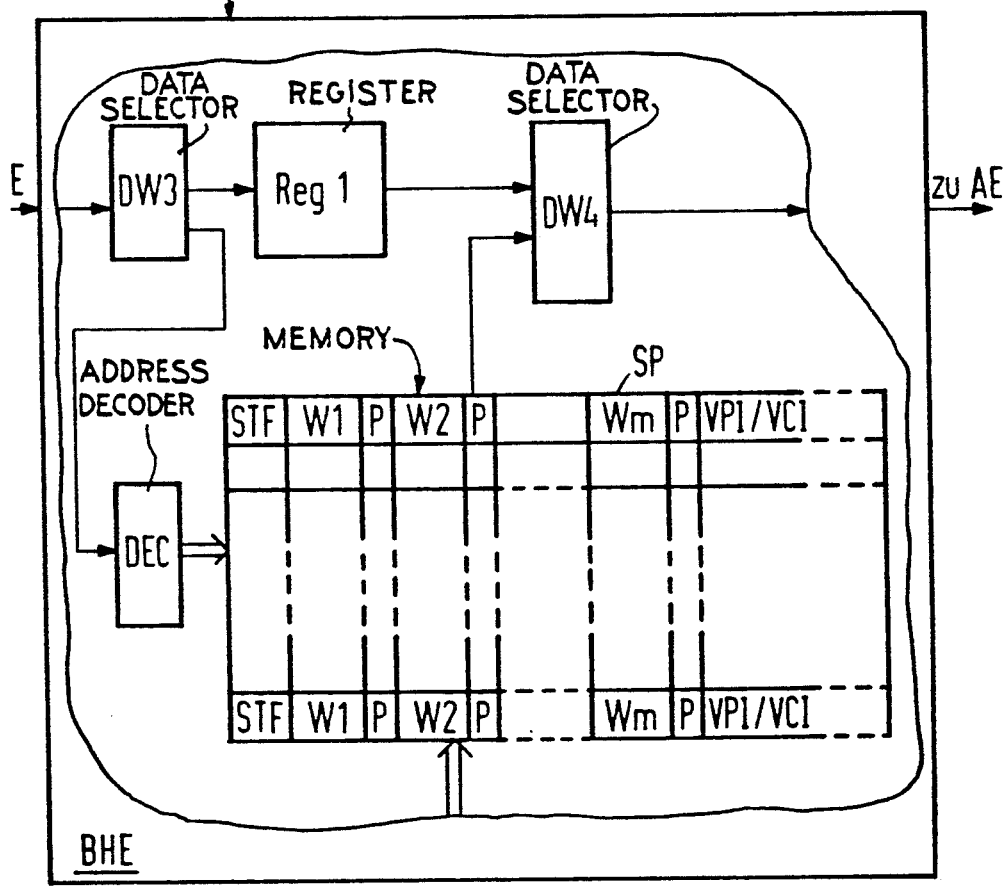
FIG. 3 is a schematic block circuit diagram schematically illustrating a possible structure of a handling device of the type schematically illustrated in FIG. 1.

FIG. 3 illustrates a possible structure of the aforementioned handling device BHE. Only those circuit portions that are required for an understanding of the present invention are thereby set forth and discussed.

A register Reg 1 is connected via a data selector DW3 to the respective input transmission line that is referenced E in FIG. 3. The message signal bits of a message cell transmitted via the input transmission line E are accepted into the register Reg 1. The cell header belonging to the respective message cell, by contrast, is supplied to an address decoder DEC via the data selector DW3. A corresponding control of the data selector can occur on the basis of a comparator arrangement that precedes the data selector and that monitors the appearance of a bit combination (start flag) indicating the beginning of a cell header.

The address decoder DEC decodes the particulars contained in a cell header in the form of a virtual channel number VCI that identifies a respective virtual connection and offers corresponding output signals. These are supplied to a memory SP as address signals. The memory SP comprises a separate memory location for each of the virtual connections possible on the appertaining input transmission line. These memory locations can be selected according to the measure of the virtual channel numbers VCI decoded by the address decoder DEC. When, as schematically illustrated in FIG. 3, a virtual connection is established, a cell header defined, for example, according to CCITT Recommendation I.361 is stored in each of the memory locations, this cell header, among other things, containing a bit pattern STF (start flag) indicating the beginning of a cell header, a plurality of routing information corresponding to the number of switching matrix stages to be traversed in the ATM switching equipment and also a virtual channel number VCI defined for the respective virtual connection on the output transmission line of the ATM switching equipment (FIG. 1) coming into consideration. Such a new cell header (self-routing header), as shall be set forth below, precedes the message signal bits of a message cell just accepted into the register Reg 1 for the forwarding thereof. The mentioned routing information are referenced W1–Wm in FIG. 3, whereby the numerals 1 . . . m respectively indicate the switching matrix stage of the ATM switching equipment to be traversed. A security information in the form of a parity bit P is thereby attached to each of these routing information.

Given an aforementioned drive of a memory location of the memory SP by the address decoder DC, the cell header stored in this memory location is read and supplied to a first input of a data selector DW4. The output of the register Reg 1 is connected to a second input of the data selector DW4. This data selector, for example, is driven by a counter (not shown) such that, first of all, a cell header read from the memory SP and, subsequently, the message signal bit stored in the register Reg 1 serially appear at the output of the handling device BHE illustrated in FIG. 3.

Figure 2:
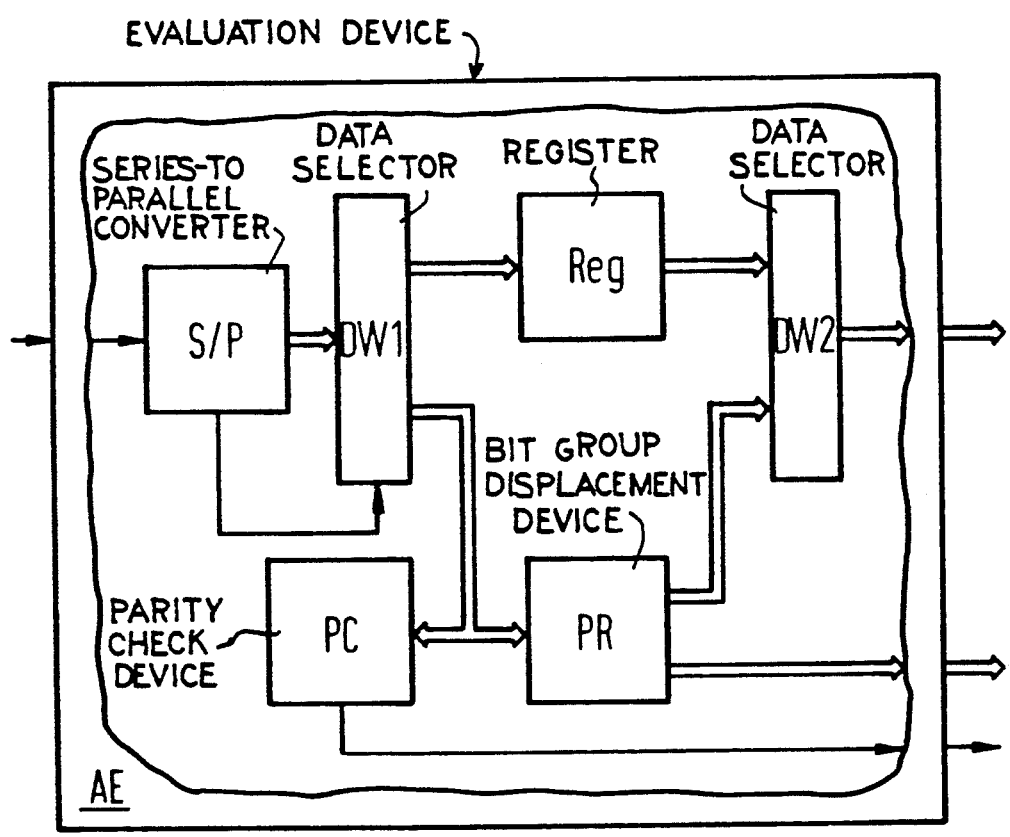
FIG. 2 is a schematic block circuit diagram illustrating a possible structure of the evaluation device schematically illustrated in FIG. 1.

FIG. 4 illustrates a possible structure of the bit group displacement device PR for the dislocation of bit groups already set forth above with reference to FIG. 2. In accordance therewith, this device comprises a first register (or input register) RAN 1 which comprises a plurality of register locations R1-Rn corresponding in number to the plurality of bit groups contained in a cell header. These register cells, for example, are drivable by a counter (not shown) such that the bit groups belonging to a cell header and transmitted via the data selector DW1 (FIG. 2) can be successively written thereinto. Each of these bit groups thereby corresponds to one of the particulars entered in a memory location of the memory SP illustrated in FIG. 3. The first bit group therefore represents the bit group STF (start flag) that indicates the beginning of a cell header. The bit groups following thereupon, by contrast, respectively contain one of the routing information W1-Wm including the security information P (parity bit) respectively attached thereto.

It will now be assumed as an example that information in the sequence STF (W1+P),...,(Wm+P)... are contained in the successive bit groups of the cell header supplied to the register arrangement RAN 1. This, for example, is the case of an evaluation device AE that directly follows one of the handling devices BHE. In accordance with this sequence, the individual bit groups, as set forth in FIG. 4, are successively entered into the individual register cells R1-Rn.

The first register RAN 1 is followed by a second (or output) register RAN 2 corresponding thereto and comprising register cells R1-Rn. The two registers are thereby connected to one another such that the contents of the register cells R1 and Rm+2-Rn of the input register RAN 1 can be transferred into the register cell R1 and Rm+2-Rn of the output register RAN 2. The remaining register cells R2-Rm+1 of the two registers, by contrast, are coupled to one another such that the contents of the register cells R3-Rm+1 of the input register RAN 1 can be entered into the register cells R2-Rm of the output register RAN 2. And by contrast, the content of the register cell R2 of the input register RAN 1 is transferred into the register cell Rm+1 of the output register RAN2, whereby the parity bit P attached to the respective routing information, the routing information W1 in this case, is inverted with the assistance of an inverter INV upon this transfer. A modified cell header is then available in the output register RAN 2, the routing information W1 in this case, including the appertaining parity bit that originally resided at the first location of the routing information being displaced in this modified cell header to the end of the routing information block upon simultaneous inversion of the parity bit. This modified cell header is then forwarded in a manner set forth above to the data selector DW2 (FIG. 2).

The routing information stored in the register cell R2 of the input register RAN 1, i.e. the routing information W1 in the present case, is separately offered over and above this in order to be able to forward, in the manner set forth above, a message cell having a modified cell header that has just been accepted into the respective evaluation device (FIG. 2).

In conclusion it should also be pointed out that the aforementioned parity check device PC of FIG. 2 can be activated by the bit group displacement device PR of FIG. 4 for an evaluation of the first routing information appearing in a cell header in that this, together with the drive of the register cell R2 of the input register RAN 1 for the transfer of a routing information, outputs a corresponding control signal to the parity check device PC.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for receiving and forwarding message cells according to an asynchronous transfer mode by way of asynchronous transfer mode switching equipment which comprises a multi-stage reversing switching matrix network including a plurality of switching matrix stages and in which each of the message cells is preceded by a routing information block having a plurality of routing information corresponding in number to the number of switching matrix stages to be traversed, comprising the steps of:

(a) attaching a separate security information to each routing information of a routing information block;

(b) evaluating each routing information in sequence for forwarding a message cell through the respective switching matrices;

(c) displacing each just-evaluated routing information in turn to the end of the respective routing information block; and (d) falsifying each respective security information upon displacement of the corresponding routing information so that a message cell is only forwarded when its routing information to be evaluated has been recognized as being free of error to prevent message cells from constantly remaining in a loop in the reversing switching matrix network.

2. The method of claim 1, wherein the step (a) of attaching a security information and the step (d) of falsifying the security information are further defined as:

(a1) attaching a respective parity bit to each routing information as its respective separate security information; and (d1) inverting each parity bit upon displacement of the corresponding routing information.

3. A circuit arrangement for receiving and forwarding serially-transmitted message cells transmitted according to an asynchronous transfer mode by an asynchronous transfer mode switching equipment which comprises a reversing multi-stage switching matrix network for receiving the message cells from a plurality of input lines, each of the message cells being preceded by a cell header including a routing information block having a plurality of routing information corresponding in number to the number of switching stages to be traversed, each of the routing information having a security information attached thereto, comprising:

a plurality of handling devices each connected to a respective input line for recognizing the beginning of a received cell header and identifying all possible virtual connections through said switching matrix network for the respective incoming line; and plurality of evaluation devices each connected to one of the inputs of the switching stages, each of said evaluation devices comprising a series-to-parallel conversion means connected to an input of the respective evaluation device for converting the serially-transmitted message cells into parallel data;

displacement means connected to said series-to-parallel conversion means for shifting the just-evaluated routing information to the end of the respective routing information block, and falsifying means in said displacement means for falsifying the respective security information upon displacement of the respective routing information so that a message cell is only forwarded when the routing information has been recognized as being free of error with reference to the attached security information and therefore cannot remain circulating in a loop in the reversing switching matrix network.

4. The circuit arrangement of claim 3, wherein:

said displacement means comprises a first register for receiving a routing information block including a plurality of aligned memory locations for storing respective routing information in an ordered sequence with the first routing information in that sequence being the just-evaluated routing information;

a second register including an ordered sequence of memory locations for storing respective routing information, said second register connected to said first register in an offset manner such that the routing information location of the just-evaluated routing information in said first register is connected to the last memory location in said second register and each of the remaining memory locations of said first register are connected to the memory location of said second register which is next earlier in the sequence; and said falsifying means is connected between said first memory location of said first register and said last memory location of said second register for falsifying the respective security information upon transfer thereof to said second register.

5. The circuit arrangement of claim 4, wherein:

said security information is a parity bit; and
said falsifying means comprises an inverter.

* * * * *